US005963620A

United States Patent [19]
Frankel et al.

[11] Patent Number: 5,963,620
[45] Date of Patent: Oct. 5, 1999

[54] INTEGRATED COMMUNICATIONS CONTROL DEVICE FOR A SMALL OFFICE CONFIGURED FOR COUPLING WITHIN A SCALABLE NETWORK INCLUDING MULTIPLE SIMULTANEOUS CALL CAPABILITY

[75] Inventors: David P. Frankel; Maxim Ladonnikov, both of Sunnyvale; Christopher K. Koverman, Soquel, all of Calif.

[73] Assignee: Jetstream Communications, Inc., San Jose, Calif.

[21] Appl. No.: 08/866,686

[22] Filed: May 30, 1997

Related U.S. Application Data

[63] Continuation-in-part of application No. 08/504,645, Jul. 18, 1995.

[51] Int. Cl.[6] .................................................. H04M 11/00
[52] U.S. Cl. .................................... 379/93.05; 379/93.05; 379/93.14
[58] Field of Search .............................. 379/92.01, 92.03, 379/93.14, 93.01, 93.05, 93.06, 93.07, 204, 205, 206, 211; 370/373, 523, 410, 522

[56] References Cited

U.S. PATENT DOCUMENTS

| 4,748,656 | 5/1988 | Gibbs et al. | 379/93 |
| 4,998,248 | 3/1991 | Matsuzaki | 370/110.1 |

(List continued on next page.)

OTHER PUBLICATIONS

Product Brochure for "FRIDAY™ Advanced Digital Answering System" from Bogen Communications Inc.
Press Release, "Ascend Announces New ISDN Member of Pipeline Family," Jun. 12, 1995.

(List continued on next page.)

*Primary Examiner*—Curtis A. Kuntz
*Assistant Examiner*—Melur Ramakrishnaiah
*Attorney, Agent, or Firm*—Haverstock & Owens LLP

[57] ABSTRACT

An integrated communications control device integrates the telecommunications environment of a small office with an interface to the telephone network. The device is a stand alone unit including a programmable control processor configured by a user based on the telephonic equipment within the office and the user's needs. The device is utilized to control telephone and data communications within the office. The device interfaces with a computer allowing the user to configure the system and create a customized telephonic environment using the personal computer. Alternatively, the device may be integrated into the PC with a plug-in card. Standard telephone interfaces are provided for interfacing to telephonic equipment such as telephones, modems and facsimile machines. Additionally, an ISDN interface allows the device to interface with and communicate over the ISDN, thereby providing a gateway to the PSTN. A display provides users with current operational status of the system. The display also includes input buttons which allow the user to make real-time configuration adjustments. Alternatively, the display includes an audio interface wherein the user is prompted and enters responsive data through the input buttons or the personal computer. Alternatively, the user provides responsive data using spoken commands interpreted by the device. Intelligence is resident within each device allowing the device to control and monitor telephonic traffic for a single user within an office over the equipment coupled within the system. This localized intelligence also allows a plurality of such devices, each at different offices, to be linked in a network environment, wherein multiple users can each have their own device and yet be linked together in a virtual office. This virtual office provides such standard office capabilities as message and call transfers between respective control devices and users at remote locations. The ISDN interface also allows the device to place multiple calls simultaneously over a single ISDN line.

18 Claims, 3 Drawing Sheets

U.S. PATENT DOCUMENTS

| | | | |
|---|---|---|---|
| 5,048,076 | 9/1991 | Maurer et al. | 379/94 |
| 5,056,132 | 10/1991 | Coleman et al. | 379/95 |
| 5,062,133 | 10/1991 | Melrose | 379/94 |
| 5,086,458 | 2/1992 | Bowen | 379/180 |
| 5,142,525 | 8/1992 | Nakatsuma | 370/13 |
| 5,206,901 | 4/1993 | Harlow et al. | 379/211 |
| 5,315,636 | 5/1994 | Patel | 379/58 |
| 5,329,578 | 7/1994 | Brennan et al. | 379/67 |
| 5,355,406 | 10/1994 | Chencinski et al. | 379/88 |
| 5,414,760 | 5/1995 | Hokari | 379/93 |
| 5,475,748 | 12/1995 | Jones | 379/211 |
| 5,490,210 | 2/1996 | Sasso | 379/100 |
| 5,544,237 | 8/1996 | Bales et al. | 379/204 |

OTHER PUBLICATIONS

Product Brochure for "MediaCom Software" from Bellcore.
"ISDN Reaches the Market," David Frankel, IEEE Spectrum, pp. 20–25, Jun. 1995.
Product Brochure for "ISDN Advisor" from Bellcore.

INTEGRATED COMMUNICATIONS CONTROL DEVICE FOR A SMALL OFFICE CONFIGURED FOR COUPLING WITHIN A SCALABLE NETWORK INCLUDING MULTIPLE SIMULTANEOUS CALL CAPABILITY

This is a continuation-in-part application of a copending application Ser. No. 08/504,645, filed on Jul. 18, 1995.

FIELD OF THE INVENTION

The present invention relates to the field of telephone communications devices. More particularly, the present invention relates to the field of communications controllers for integrating a plurality of functions with telephonic office equipment such as telephones, facsimile machines, computers and the like into a scalable network.

BACKGROUND OF THE INVENTION

An important aspect of most daily operations within an office is the ability to handle telephone calls and data transmissions to and from the organization in an efficient and timely manner. One well known method of handling a multitude of incoming calls is by the use of a private branch exchange (PBX) or central exchange (Centrex). PBX systems are on-premises exchange systems serving a business, which can be coupled to multiple incoming and outgoing trunk lines and multiple telephone sets within an office. Centrex systems are similar in many respects to PBX systems. One well known difference is that Centrex systems are located at a central office at the telephone company. PBX and Centrex systems provide a variety of functions such as switching of calls from the incoming trunk lines to any of the extensions, transferring calls between extensions, and switching calls between extensions and outgoing trunk lines. Numerous PBX and Centrex systems are well known and commercially available. PBX and Centrex systems control a plurality of telephony devices and operations using a centralized control apparatus.

A number of telecommunications systems are also available which provide users with flexibility in the handling of telephone calls. One example is a personal computer based facsimile answering machine. To operate a facsimile answering machine from a personal computer, a processing card is resident in a personal computer and is coupled to an incoming telephone line through a fax modem. A telephone can also be coupled to the telephone line, through the modem. However, in such systems a voice call and a facsimile data transfer cannot be performed simultaneously. Incoming telephone calls are answered by the computer card and the incoming message is recorded. Unfortunately, the telephone will ring regardless of the type of incoming telephone call, thus creating confusion for the user because he or she will be unsure as to whether the call is an incoming facsimile message which the computer needs to answer, or if the call is a voice call which the user may want to answer. If the call is an incoming facsimile message, the user must know not to answer the telephone. In such systems, if the user does not pick up the phone in a predetermined number of rings, the computer will answer the incoming call and will then determine if the call is a voice call or an incoming facsimile message. If the call is a voice call, the computer will play a pre-recorded message and will then record an incoming message. If the incoming call is a facsimile message, the computer will record the data and will post a message to the user that a fax communication was received. The user can then print the fax communication when desired.

A number of automated call processing and voice messaging systems are known in the art. This type of system can be coupled to a PBX or Centrex system and used to automate the answering of incoming calls from the outside telephone network and the taking of messages when the extensions are not answered by the called party. Such voice messaging systems incorporate such features as the recording of voice messages for users in what are known as user "mailboxes." One such system is described in U.S. Pat. No. 5,355,406 issued to Chencinski et al.

Chencinski describes an integrated call processing and messaging system that is controlled by customized applications. The system incorporates a voice messaging system and applications processor coupled to a PBX system. The PBX and voice messaging system supply information to the applications processor related to an incoming call. The applications processor thereafter begins execution of a call processing flow program designed to handle the processing of an incoming call and associated messages. The call and message handling capabilities include call processing, voice messaging, interactive voice response, host data base access, call routing features, and local database access.

While the system taught by Chencinski is effective for its intended purpose, that of supporting a large business where a centralized telephone intelligence is sufficient, it cannot be effectively adapted for a small office environment, such as a home office. This is true because the system of Chencinski requires a PBX type switching system. Such PBX type switching systems tend to be large and expensive. A PBX type switching system is most effective at handling the telecommunications networks of large companies where intelligence is centralized in the PBX device and numerous extensions are coupled thereto. Furthermore, the system taught by Chencinski requires a system administrator that is proficient in the call flow programming language. Still further, the system of Chencinski does not provide users with the ability to make real-time changes to the configuration.

In addition to call processing and messaging some automated telephone systems known in the art provides a capability of outdialing to a set of telephone numbers at the same time. Such a system is illustrated in U.S. Pat. No. 5,475,748 issued to Jones. This type of systems, however, are not suitable for small businesses or home offices. First, these systems are installed near a central office or as part of a PBX because these systems have to be coupled to the central office or PBX via multiple telephone lines in order to perform multiple outdialing operations. A small business or home office may not have access to a PBX or multiple telephone lines. Second, because each outdialing operation employs one of the telephone lines, the number of outdialing operations that can be made simultaneously is limited to the number of available telephone lines. Thus, if the number of outdialing operation desired exceeds the number of telephone lines, some of the outdialing operations will have to be done sequentially. Consequently, for a small business or home office having a single telephone line, an outdialing operation can only be performed after a previous one has terminated. Therefore, for small businesses, no significant amount of time is saved by using the automated telephone system as disclosed by Jones.

A telephone interface system is described in U.S. Pat. No. 4,748,656 to Gibbs et al. Gibbs et al. describe an interface arrangement which interconnects a business communication system with a telephone station set. This interface is implemented in a personal computer which serves to control the operation of the associated telephone set and also provide business communication services. All signalling from the business communication system is received by the personal computer, interpreted and appropriate control signals are then forwarded under control of the software resident on the personal computer to activate the digital telephone station set. This arrangement enables a user to create software on the personal computer to control the operation of the telephone station set associated with the personal computer. The user can implement new features and services independent of the operation of the business communication system.

Typical business telephone systems, as those described, provide the user with capabilities beyond what is offered by the Public Switched Telephone Network (PSTN). These capabilities are tailored towards the needs of the users but typically include abbreviated dialing, call transfer capability, sequential call forwarding, status reporting, call coverage, camp-on, automatic call-back, voice messaging and voice message reply and forward.

Unfortunately, the systems referred to above provide telecommunication services which combine with a switching network such as a PBX or Centrex system and are directed at a specific type of environment. These systems are effective for their intended market because they provide centralized intelligence which serves multiple users performing a number of preconfigured functions. PBX systems, which are usually coupled to a voice messaging system, provide a centralized and intelligent unit for providing service to a number of pieces of associated telephonic equipment within a large office environment. This type of system is analogous to a mainframe computer which serves a number of dumb terminals. The individual terminals must be located physically close to the central chassis of the system for connection within the system. The maximum amount of users which can be included within such a system is fixed by the capacity of the central chassis. The result is that the most capable systems are available only to the largest customers. Smaller customers typically install cheaper and more limited systems which must then be replaced when they are outgrown. Because of the physical limitations, requiring close proximity of users, users who are at remote locations typically give up much of the desired functionality.

The centralized intelligence units, as described above, are not efficient at serving a single user performing a number of reconfigurable functions. This would be analogous to a mainframe computer serving a single home user.

The Integrated Services Digital Network (ISDN) is a world-wide standard adopted by the International Telecommunications Union which provides a "basic-rate interface" (BRI) between the telephone company's central office and a subscriber having a bandwidth capacity of 144 kb/second. This interface is divided into three channels including two bearer (B) channels, each having a bandwidth capacity of 64 kb/s, and one delta (D) channel, having a bandwidth capacity of 16 kb/s. Each bearer channel can carry the equivalent of an analog telephone call. The delta channel transports signalling information such as call-setup and call-progress information. Telephone calls are established using the D-channel. In prior art ISDN communications devices, established calls must be assigned to a B-channel. In those devices, a maximum of two separate conversations can take place simultaneously via two separate phone calls assigned to the two B-channels. If more than two simultaneous phone calls are desired, more BRI ISDN lines would be required to provide facilities for more than two calls.

The ISDN connects a subscriber to the Public Switch Telephone Network (PSTN) which allows the subscriber to conduct traditional telephone functions over the ISDN line. When two ISDN subscribers are communicating with each other, enhanced functionality can be achieved. For conventional phone calls, speech is encoded on a B channel exactly as it is within the digital networks of the phone carriers. Because almost all of the modem world's inter-exchange networks are now digital, to support analog telephony, the end offices of the network perform a final step of digital-to-analog conversion. However, when a phone call is destined for an ISDN subscriber, the network simply passes the encoded data stream to the customer's ISDN equipment where the necessary conversion takes place. Thus, for regular telephony, including conventional fax and modem transmissions, ISDN is completely interoperable with the installed base of analog phones.

For data transmissions, the fill 64 kb/s of each B channel can be made available, separately or together, to attached computer equipment, while packet data, at up to 9600 b/s, can share the D channel with signalling information. If both ends of a data call are handled by ISDN, data can be transported at up to 64 kb/s, without intervening analog-to-digital conversions. Two separate calls can be made between the same end points, and the bandwidth can be aggregated to achieve up to 128 kb/s for data transmission. Higher data rates may be achieved if data compression is also employed.

Over the ISDN, all information for establishing and terminating calls is sent digitally. A user's ISDN equipment originates a call by sending a call set-up message, including the destination phone number, over the D channel to the network. To indicate an incoming call, an analogous set of messages is sent from the network to the ISDN equipment. This data stream typically includes identification of the calling party, the dialed number, since multiple numbers can be configured to terminate at the same interface, and information about how the call was routed. Once the call is established, communication takes place over the B channel (s).

Connections for data transmissions over the ISDN are made almost transparently. No modem negotiation or training is necessary with an end-to-end ISDN data call. For such a data call, a connection can be made, data transferred and the connection dropped, in seconds. In addition, because the ISDN sends signalling information over a separate channel, notification of incoming calls can be delivered even if both B channels are in use, allowing the terminating equipment to decide whether to reject the new call or drop an existing connection and accept the new call.

As the business work place changes its shape and function, an increasing number of business functions are being performed in small offices or out of individual's homes. In this small environment, single users require many of the features of larger PBX based systems but on a smaller scale and with greater control and flexibility to the user without the expense and overhead of traditional business telephone systems. What is needed is a stand alone telecommunications device that integrates the telecommunications environment of a small office and couples it to the Integrated Services Digital Network (ISDN). What is also needed is a telephonic system with integrated control functions including machine intelligence which is distributed to each individual user and is easily upwardly scalable to link multiple users together.

What is needed is a device which will allow a user to initially configure a telecommunications device to meet his or her general needs, provide him or her with current configuration status and also allow the user to perform real-time configuration adjustments quickly and easily.

What is further needed is a telecommunications device that not only answers calls, but also permits a user to screen an incoming call by listening to the callers message and having the ability to pick-up a handset and begin conversing with the caller at any time during the call.

What is still further needed is a device that allows for a virtual office to be created between a plurality of small offices, each located at a different location.

Under certain circumstances, a user will desire to place more than one telephone call at a single time. For example, the user may desire to contact a person knowing that the person is in one of several places, eg., office, car, home or club. Using prior art equipment, when a user only has access to a single telephone line, the user will necessarily dial each number sequentially and wait to determine whether a call is answered before continuing with a next call. If no call is established, the time spent attempting to reach a connection is essentially lost. What is further needed is a device that allows multiple outbound calls to be placed simultaneously using a limited number of telephone lines.

SUMMARY OF THE INVENTION

An integrated communications control device integrates the telecommunications environment of a small office with a telephony interface to the telephone network. The control device is a stand alone unit that includes a programmable control processor which is configured by a user based on the telephonic equipment within the office and the user's needs. The control device is utilized to control telephone communications within the office as well as data communications to and from the personal computer. The control device interfaces with a personal computer thereby allowing the user to configure the system and create a customized telephonic environment using the personal computer. Alternatively, the device may be integrated into the PC with a plug-in card. Standard telephone interfaces are provided for interfacing to telephonic equipment such as telephones, modems and facsimile machines. Additionally, an ISDN interface allows the control device to interface with and communicate over the ISDN, thereby providing a gateway to the PSTN. An LCD display on the control device provides users with current operational status of the system. The display also includes input buttons which allow the user to make real-time configuration adjustments. Alternatively, the display includes an audio interface wherein the user is prompted and enters responsive data through the input buttons or the personal computer. Alternatively, the user provides responsive data using spoken commands interpreted by the device.

Intelligence is resident within each control device allowing the control device to control and monitor telephonic traffic for a single user within an office over the equipment coupled within the system. This localized intelligence also allows a plurality of such control devices, each at different offices, to be linked in a network environment, wherein multiple users at different locations can each have their own device and yet be linked together in a virtual office. This virtual office provides such standard office capabilities as message and call transfers between respective control devices and users at remote locations.

Each control device also allows multiple outbound calls to be made simultaneously over a single ISDN line. Multiple outbound calls are placed simultaneously but not associated with a channel until they are answered. The first calls answered are assigned to the available channels and unanswered calls are disconnected.

DETAILED DESCRIPTION OF THE PREFERRED EMBODIMENT

An integrated communications control device is designed and intended for use within a small office having as few as a single user. The integrated communications control device of the present invention may also be used to create a scalable network and link together multiple users in multiple locations, each having an integrated communications control device. Each device within this scalable network includes its own distributed intelligence eliminating the need for a central host. The integrated communications control device is coupled between a central office ISDN line and a number of pieces of telephonic equipment, such as a telephone, facsimile machine and modem, thereby forming a system within the office. A personal computer can interface with the integrated communications control device thereby allowing a user to configure the device according to their specific needs through the personal computer. Alternatively, the device may be integrated into a personal computer using a plug-in card. Each such integrated communications control device has its own localized independent intelligence, thereby allowing the integrated communications control device to control the communications traffic within its respective office. A display and input buttons are also included for the integrated communications control device allowing the user to monitor the status of the system. The display and input buttons can also be used to configure the system. Alternatively, the display further includes an audio interface which is used to provide prompts or messages to the user. The user then responds to these prompts using the input buttons, spoken commands or input devices of the personal computer, including a mouse or keyboard. Multiple integrated communications control devices, one in each separate office, can also be linked together to create a virtual office between the plurality of offices, allowing the devices to appear to an incoming caller, as if each separate small office is actually physically part of a larger office. Therefore, calls and messages can be transferred between multiple remote offices, each having an integrated communications control device, in a manner similar to extensions within a single office.

Hardware

Figure 1:
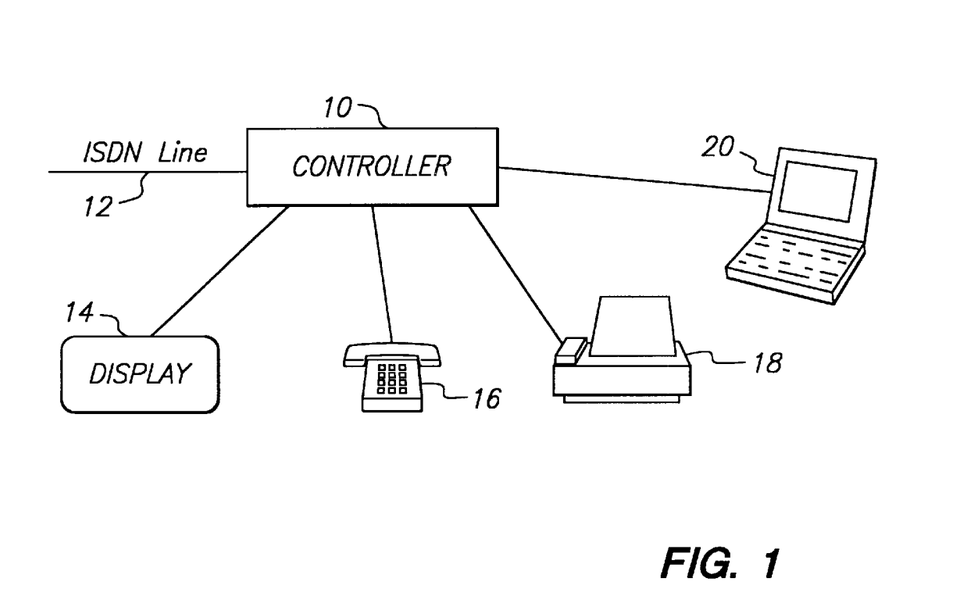
FIG. 1 illustrates the connections of an integrated communications control device within a small office.

FIG. 1 illustrates the connection of a system including an integrated communications control device 10 and telephonic equipment within a small office. The integrated communications control device 10 includes a display unit 14 for communicating with the user. The control device 10 is coupled to an ISDN line 12 for incoming and outgoing communications from the office. The control device 10 is also coupled to a telephone 16, a fax machine 18 and a computer 20 for integrating and monitoring various functions and operations within the system. Alternatively, the device may be integrated into the PC with a plug-in card.

Figure 2:
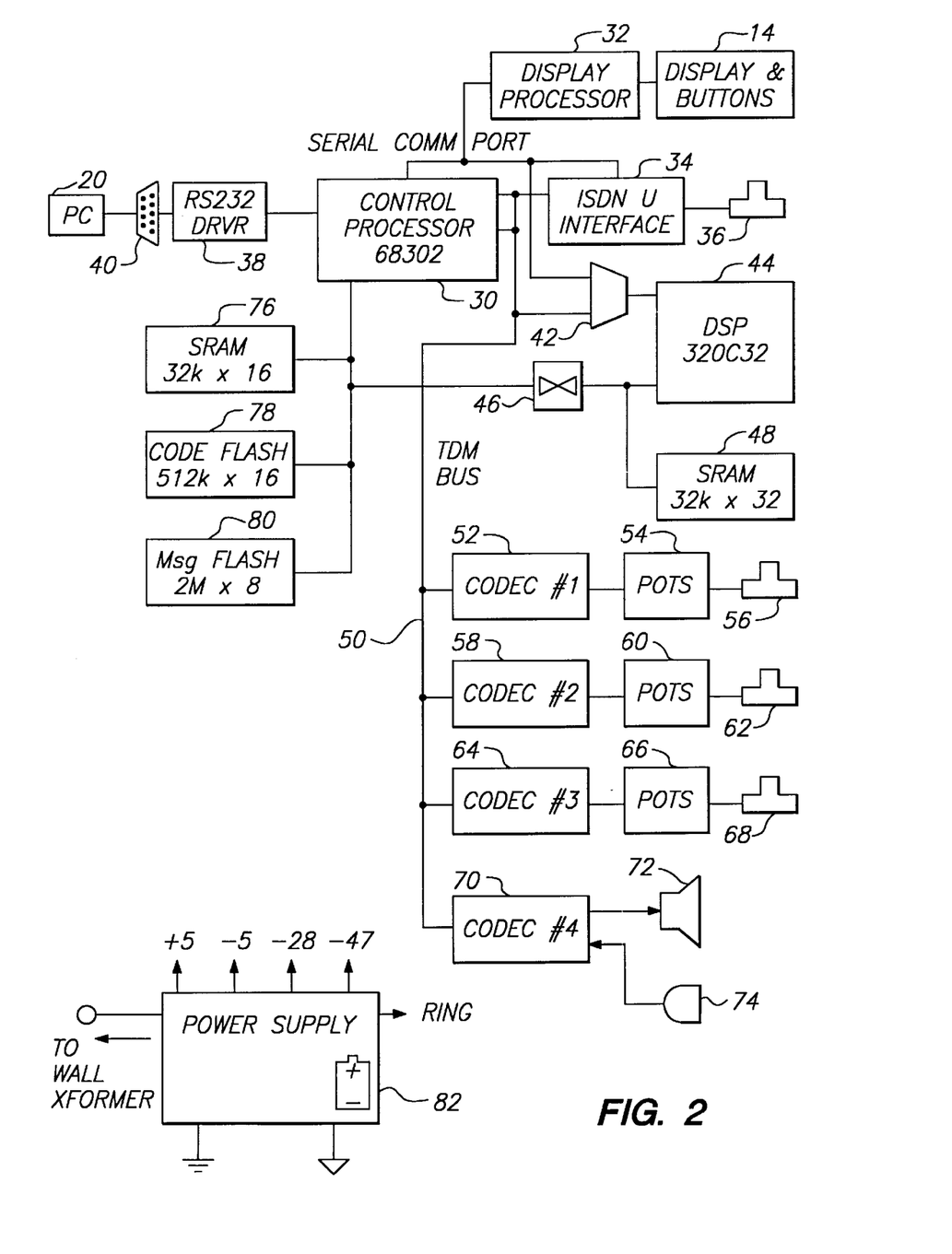
FIG. 2 illustrates a block diagram of the hardware configuration of the preferred embodiment of the present invention.

FIG. 2 illustrates a block diagram of the hardware configuration of the integrated communications control device 10 of the present invention. The present invention is coupled to an ISDN line 36 via an ISDN U interface 34. In the preferred embodiment, the ISDN U interface 34 is a Motorola 145572 and an RJ45 connector. The ISDN line 36 couples the integrated communications control device 10 to the central office of the telephone company for sending and receiving communications over the telephone line. The central office routes calls to and from the ISDN line 36. One ISDN circuit allows for two B channels (voice channels) to operate simultaneously. This allows a user to maintain a voice call, for example, while data is being transferred or a fax is being sent or received.

A control processor 30 is coupled to the ISDN U interface 34 through a time division multiplexed (TDM) bus 50 and runs a suite of embedded software including the ISDN protocol stack, the caller interface and data communications protocols. In the preferred embodiment, the control processor 30 is a Motorola 68302 processor. The control processor 30 is further coupled to an RS232 driver 38 and to a personal computer 20 through an RS232 port 40. The personal computer 20 provides a user with a primary interface for configuring the system. As described, in the preferred embodiment the integrated communications control device is coupled to the personal computer 20 through an RS232 interface. Alternatively, other interfaces between the device and the personal computer are possible including, but not limited to Ethernet and a parallel port interface.

A digital signal processor (DSP) 44 is coupled to interface directly with the control processor 30 to pass control information, modem data and encoded voice data. In the preferred embodiment, the digital signal processor 44 is a Texas Instruments TMS320C32 processor. The DSP 44 is further coupled to the TDM bus 50 in order to communicate with telephone peripherals via a plurality of coders/decoders (codecs) 52, 58, 64 and 70, which perform analog-to-digital conversion and provide a plurality of standard telephone interfaces.

The plurality of codecs 52, 58, 64 and 70 are coupled to the control processor 30 and the DSP 44 for interfacing with telecommunications peripherals such as modems, telephone extensions and facsimile machines. The standard telephone interfaces 56, 62 and 68 provide the connection to a standard loop start telecommunications device such as a phone, facsimile machine or a modem. Loop start is the type of loop signalling used by a plain telephone set wherein a loop circuit is created between the central office and each telephone set. A voltage of nominally 48 VDC is supplied by the central office such that when the telephone set hook switch operates and closes the loop, the central office is seized and a call can be initiated. A speaker 72 and a microphone 74 are also coupled to the codec 70 to allow the user to playback and record voice messages. In the preferred embodiment, three standard telephone interfaces 56, 62 and 68 are included within each integrated communications control device. Any combination of telephones, facsimile machines or modems can be coupled to the standard telephone interfaces 56, 62 and 68 allowing the controlled office to be selectively configured according to the equipment used.

A plurality of memory devices are also coupled to the control processor 30 and the DSP 44. These memory devices include program flash memory 78, data flash memory 80 which is read from and written to in block mode for storing voice and facsimile data and static random access memory (SRAM) 76 which is used for software operation. The DSP 44 is also coupled to an additional SRAM 48 which is an extension to the internal memory of the DSP 44 to support additional code space and data area.

A display processor 32 and display 14 are coupled to the control processor 30 for allowing the user to monitor the activities of the system and providing a user interface to the system of the present invention. The display processor also scans the buttons and reports all key presses and releases to the control processor 30. The display 14 comprises an LCD display for visual output to the user regarding the current status of the system. The display 14 is utilized by the control processor 30 to send messages and prompts to the user, as necessary. Further, a plurality of input buttons on the display 14 allow the user to control predefined system operations in real-time. These predefined operations include such tasks as listening to messages, recording greetings and monitoring and directing incoming and outgoing calls. In an alternative embodiment, the display 14 includes an audio interface which is used to provide prompts or messages to the user. The user then responds to these prompts using the input buttons on the display 14 or input devices of the personal computer, including a mouse or keyboard.

The integrated communications control device of the present invention is powered by a power subsystem 82 that is integral to the main circuitry and includes a wall mounted transformer that generates approximately 16 VDC. The specific voltages required by the invention and supplied by the power subsystem 82 are: +5VDC at 1800 ma±5%; −5VDC at 100 ma±5%; −24VDC at 100 ma±10%; −48 VDC at 15 ma±10%; and 65 VRMS AC±20% (20 hz±3 hz). A battery backup can also be incorporated for providing power in the event of a power failure.

Software

There are three software groups utilized within the present invention: the control software; the DSP software; and the personal computer software. The control software is stored within the control processor 30 and is responsible for all of the embedded functions of the integrated communications control device. The main components of the control software are an operating system, an ISDN protocol stack, a monitor program, message handling routines, a telephony user interface, a local user interface, a tracing and error reporting system, remote access support system and a personal computer communication protocol. The operating system within the control software supports scheduling of tasks, task to task messaging, timers, debugging tools etc. The ISDN stack supports a variety of ISDN protocol standards, including North American NI1 and NI2, 5ESS, DMS100, as well as international variants. Software implementing the ISDN stack is available for license from numerous commercial software vendors. In the preferred embodiment, the ISDN protocol stack is from Telesoft International, Inc.

The monitor program allows initiation and termination of ISDN calls and other debug functions, including memory patching and ISDN state tracing. Message handling routines control the record and playback of voice messages and facsimile data to and from the flash memory. When a voice message or facsimile is received and recorded, it is saved within the flash memory until deleted by the user. The telephony user interface allows a user to access the system and invoke changes over the telephone line from a remote location by calling into the system (examples include listening to messages, changing greetings and changing call forwarding targets), or from a local telephone directly connected to one of the standard telephone interfaces 56, 62 and 68. The desktop user interface controls the interface between the local display 14, the keyboard and the personal computer 20. In this manner, the desktop user interface controls communications with the user, through either the display 14 or the personal computer 20 regarding the status and configuration of the system. The tracing and error reporting system assists in the diagnosing of problems in the field. The remote access support system allows remote access to the system in order to modify or alter the system configuration. This remote access support system also allows the system to be accessed and updated over the ISDN line. This remote access can be achieved over the ISDN line without ringing the phone in the user's office or requiring any user action. The personal computer communication protocol controls communication between the integrated communications control device and the personal computer 20 via the RS232 serial link 40.

The second software group is the DSP software group which handles all of the manipulation of voice-band data. For example, the DSP software group controls voice encoding and decoding, time scale modification of the message playback, DTMF detection and generation, incoming and outgoing automatic gain control (AGC), talk detection, silence suppression, time-division multiplex (TDM) time slot switching, facsimile modem data pump and spoken command recognition. A number of simple DSP algorithms are well-known in the art, while software implementing the more complex functions is available from a variety of commercial software suppliers. The preferred embodiment of the present invention includes software to implement the DSP telephony functions is from DSP Group, Inc. and Dallas Software, Inc.

The third software group is the PC software group which includes five sub-components: a PC application; a Telephony Applications Programming Interface (TAPI) service provider; a virtual serial port driver; a serial data manager; and a Messaging Applications Programming Interface (MAPI) service provider. The PC application provides a Windows™ based application program for complete configuration and control of the integrated communications control device using the personal computer 20 which is coupled to the system. TAPI is an industry standard which permits application programs to interact with telephone hardware for the purpose of displaying status, indexing call data and automating the placement of calls. The TAPI Service provider provides a standardized method of control over the voice and data communications features of the integrated communications control device. The virtual serial port driver manages multiple virtual serial communication ports which are used to transmit and receive digital data over either of the ISDN B channels. The serial data manager coordinates the communication of all information between the other software components and the integrated communications control device over a single physical port to prevent device contention and data corruption. This implements a protocol for multiplexing the various data and control channels between the integrated communications control device and the personal computer 20. The MAPI service provider permits the exchange of stored messages, including voice, data and facsimile, between the integrated communications control device and the personal computer.

Features and Operations

The preferred embodiment of the present invention supports a plurality of reconfigurable features which define the telecommunications environment. These features can further be divided into two categories. The first relate to those features that affect incoming calls and the second relate to those features affecting outgoing calls.

Due to the fact that the features able to be supported by the integrated communications control device of the present invention are defined primarily by the software component, the following features are not intended to limit the number and/or types of features able to be supported.

In the preferred embodiment, the integrated communications control device of the present invention allows a user multiple options for outgoing calls. To place an outgoing call on a telephone coupled to one of the standard telephone interfaces 56, 62 and 68 a user picks up the telephone handset and places a call in a usual manner. When the telephone handset is picked up and the telephone is off-hook one of the ISDN B channels is allocated and a call may then be placed. A user can also conference two calls together and conduct a conference call controlled by the integrated communications control device. The integrated communications control device allows an ongoing call to be placed on hold and rejoined at a subsequent time by pressing a hold button on the display 14.

A telephony user interface is used to allow a user to check the status and to change the configuration of the system from a remote location. A user can access the user interface by dialing into the system from a remote location or from a telephone coupled to one of the standard telephone interfaces 56, 62 and 68. The user can listen to recorded messages, change greetings, change call forwarding target numbers and change other configurable features over the user interface. Audio prompts guide the user through this process.

The preferred embodiment of the integrated communications control device of the present invention allows a user multiple options for controlling the handling of incoming calls. A greeting library is maintained to store multiple greetings, each of which can be chosen by the user or specified to be used in specific situations. A greeting is recorded by a user using the microphone 74. The greeting library is saved within the data flash memory 80. A user specifies a greeting to be used from the greeting library or can specify that a particular greeting is to be used in a specific situation. For example, after business hours, a first greeting can be used and during business hours a second greeting can be used. A separate greeting can also be specified for calls from a particular number or set of numbers.

A user can configure the number of rings which are to be allowed before the integrated communications control device answers an incoming call, thereby giving the user the opportunity to answer the incoming call before it is automatically answered. If a user is in the office, they might configure the system to allow four rings before an incoming call is automatically answered. Then, if the user is on another call or is otherwise unavailable when an incoming call comes in, the integrated communications control device of the present invention answers the call automatically after four rings. If a user is out of the office, they might then configure the system to automatically answer an incoming call after one or two rings. A toll saver feature can be employed, if selected by the user, where an incoming call is automatically answered on a lesser number of rings, if there is at least one saved message within the system.

Once an incoming call is automatically answered by the integrated communications control device, the selected greeting is played to the caller and then if the caller desires to leave a message that message is recorded. If the incoming call is a facsimile or data message, the integrated communications control device recognizes the dialed number and routes a facsimile message to the facsimile machine. If no facsimile machine is connected within the system, the facsimile message is saved so that it can later be printed by the user. At any time while the caller is leaving a message, the user can pick up a handset of a telephone coupled within the system to automatically be connected to the caller. Once an incoming message is saved, a prompt is generated on the display 14 to notify the user that there are saved messages. The system of the present invention also supports a toll saver feature, as described above, if there are saved messages within the system. The preferred embodiment of the present invention allows two incoming messages to be recorded simultaneously.

The integrated communications control device also includes the ability to provide the user with information about an incoming phone call while the phone is ringing. The device notifies the user which number or location the incoming call is coming from. This information is received from the central office over the ISDN line as part of the call set-up message. The user can then determine if they wish to answer the phone or let the call be answered automatically by the integrated communications control device. This information is provided to the user on the display 14 or through the personal computer 20.

To connect the device into a scalable network or group of devices, a list of group members and appropriate information about each member is stored within the memory of the device. The device then uses this group list and the information about an incoming telephone call to determine if the call is from a member of the group.

The integrated communications control device of the present invention also allows an incoming call to be redirected to the user at a different location, to another user or to an assistant. If a user knows that they are going to be away from the office, the integrated communications control device can be configured to forward calls to a number specified by the user. This configuration can be performed using the access interface or the personal computer 20. A greeting can be used in conjunction with the forwarding of calls. For example, when a user is out of the office, a greeting can be played such as "I am not here. To be forwarded to my cellular phone press 1." If the caller then presses "1" the integrated communications control device transfers the call to the cellular phone.

The system can also be configured to transfer an answered call to an assistant if the caller desires. To transfer calls to an assistant, a greeting can be played such as, "Joe Jones is not available, to be transferred to an assistant press 0, otherwise stay on the line to leave a message." can be played. Then if the caller desires to talk to an assistant, rather than leave a message, the call is transferred to a preconfigured number.

The integrated communications control device can also be configured to call a pager number in specific predefined situations. This feature can be used to page the user after a message has been left at the office or on the occurrence of any other specified event, thereby notifying the user that a message has been recorded.

Multiple integrated communications control devices, each at different locations, can be linked together in a network environment thereby forming a virtual office. This network environment allows calls and messages to be transferred and forwarded between office locations. This transferring operation is all transparent to the caller. If two users, each at a different location, are linked together into a virtual office, a call taken by user1 can be transferred to user2 without the caller knowing that user1 and user2 are not in the same office. This function can also be used to allow an incoming phone call to be answered in one of the multiple linked offices. In a situation where a user is working at home, incoming calls at the office can be directed to the user's home telephone for answering.

The integrated communications control device can be used to send data to and receive data from the personal computer coupled to the device. If data is being transferred between two integrated communications control devices according to the present invention, then the capabilities of the ISDN are exploited and the data is transferred directly over this digital interface. This data transfer can be conducted automatically without the users at either end of the transfer being explicitly aware that a call has been placed or answered by an integrated communications control device.

When a call is initiated by an integrated communications control device to another linked integrated communications control device, in addition to the called number, the calling device also specifies user-to-user signalling information. This user-to-user signalling information is sent over the D channel. At the receiving end of the call, the receiving device receives the calling number as well as the additional data items specified in the user-to-user signalling information as part of the call set-up message delivered by the network. A called device recognizes an incoming call as being from a member of its group because the calling party identification transmitted with the call set-up information matches an entry in the group list. The receiving device then displays the group member's name and sequence number on the display 14. The integrated communications control device can also be configured to apply special treatment to incoming calls from other group members such as ringing the telephone with a distinctive cadence, playing a special tone, routing the call to a user-defined location or playing a specific prerecorded message to the caller.

The integrated communications control device also allows a user to transfer a call to another member of the group, where both members are equipped with compatible devices. To transfer a call to another member of the group, the user selects the transfer feature and indicates the destination member's sequence number. A call is placed to the destination member by the device, with the user-to-user signalling coded to indicate that this is a transferred call and to indicate the identity, if available, of the party on the line. At the destination device, the incoming call is recognized as a transferred call and the transferring user and the party's identity are displayed for the destination user. If the call is accepted by the destination device, the transfer is complete and the original user disconnects from the call. If the call is not accepted, the device notifies the original user of the failure and the reason that the call was not accepted, including a busy signal, no answer by the destination device or a specific reason code from the destination device. The original user is then reconnected to the original call.

A call coverage feature allows a user to specify one or more other group members who can answer incoming calls for the user when the user is unable to do so. The user specifies the sequence of the group members designated to take the calls. This sequence is stored within the memory of the integrated communications control device. When the device determines that an incoming call requires call coverage treatment, because the user is busy or does not answer, it places a call to the first entry in the call coverage list, indicating in the user-to-user signalling information the reason for the call and the identity, if known, of the original caller. The destination device displays the available information when the call arrives. If this call is accepted by the destination device, the transferring device bridges the original call with the new call and disconnects. If the call is rejected, the transferring device repeats the process with the next entry in the list until one of the group members accepts the call. If the list is exhausted without successfully transferring the call, the transferring device plays an appropriate message for the caller and records a voice message.

A camp-on feature allows a user to receive automatic notification that another member of the group has transitioned from a busy state to a free state. To activate this feature, when the user calls the other member and receives a busy indication, the user then selects the camp-on feature. The user's device then places another call to the target member's device, requesting camp-on via user-to-user signalling. The target member's device accepts the request and clears the call. When the target member completes their call and transitions from a busy to free state, the target member's device places a return call to the original user, notifying them that the target user has now completed their call.

To broadcast a voice message to one or more members of the linked group, a user records the message on their local integrated communications control device and enters a list of one or more sequence numbers, to receive the message. The message is digitized, compressed and stored by the local device. A data call is then placed to each entry in the list by the integrated communications control device. User-to-user signalling information is sent to indicate that a voice message is being transmitted. When the call is answered, the encoded message is transmitted to the receiving device. The receiving device then acknowledges receipt of the message. The user of the receiving device is unaware of the data call, but is notified of the arrival of a new message by an indicator light on the display 14 and a recorded announcement. Failures, such as a lack of storage space for the incoming message on the target device, are indicated by user-to-user signalling in the reverse direction and an appropriate indication to the originating user.

Stored voice messages are similarly forwarded to other members of the group with a device to device transmission. A user can select a voice message for forwarding and indicate the sequence number of a recipient. The user's integrated communications control device records an introduction to be added to the beginning of the existing message and then transmits the message to the target device as indicated above.

The integrated communications control device can be used to place multiple calls simultaneously over a single ISDN signal line. It is desirable in many situations to have the ability to place calls to a plurality of locations simultaneously. For instance, a user connected locally to one of the control devices of the present invention may wish to contact a second party that might be at one of several remote locations, for example at the office, car, home or club. Also, when the integrated communications control device is used to forward calls, multiple outbound calls can be placed simultaneously for forwarding a call to the first answered telephone. In this manner, a call could be forwarded to a user's cellular telephone and their home telephone simultaneously and the call will be forwarded to the first answered telephone and disconnected to the other telephone. In another instance, one or more locally connected agents may wish to contact customers defined by a list of telephone numbers. By allowing multiple calls to be placed simultaneously, the waiting time for an answer at the separate locations runs concurrently rather than sequentially, thereby reducing a user's or a caller's waiting time for an answer at one of the separate locations.

The operational protocol for ISDN requires that a B-channel is available in order for an outgoing call to be placed. However, ISDN does permit a call to be placed on "hold". When a call is placed on "hold", a B-channel associated with the call becomes available for another call. This function is typically used to allow a new, incoming call to be answered, or to establish a conference call with another remote party. Each call placed on hold is identified by a "call reference value" (CRV). This CRV is exchanged on a D-channel and is used to identify specific information or initiate an action associated with a particular call.

Figure 3:
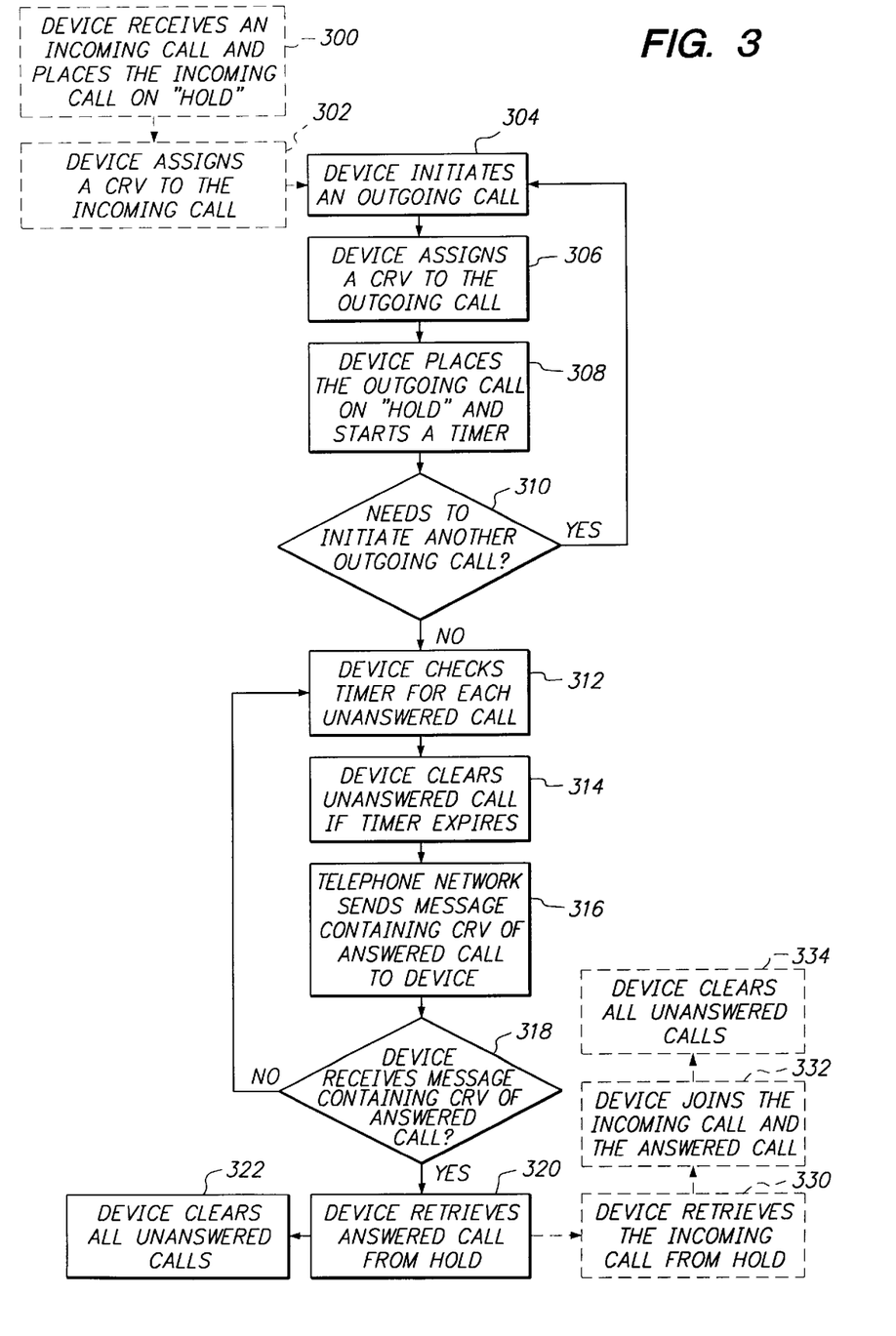
FIG. 3 illustrates a flow diagram of the simultaneous multiple calls function of the present invention.

The integrated communications control device of the present invention allows a call to be made to all of a plurality of locations using a single ISDN line. FIG. 3 illustrates a flow diagram of the steps, implemented to place multiple outbound calls simultaneously. First, the device initiates an outgoing call to one of the plurality of locations (box 304) and concurrently assigns a CRV (box 306). That call is then placed on hold and a timer is started (box 308). The process is repeated for each of the plurality of locations, until all of the necessary calls have been initiated (box 310). After all the calls to the plurality of locations are initiated, the device determines if any of the timers has expired (box 312).

As each of the timers expires, the device clears the associated call via the D-channel (box 314). If an outgoing call is answered, the telephone network will send a message to the calling device over the D-channel indicating that a call is answered (box 316). The device then periodically checks if any of the outgoing calls have been answered until all the timers expire or until it receives a message indicating that a call is answered (box 318). The message contains the CRV associated with the call that has been answered. Using this CRV, the calling device then retrieves the answered call from hold by assigning the call to one of the B-channels (box 320). The calling device then clears the remaining unanswered or busy outbound calls by sending the appropriate instructions to the telephone network over the D-channel (box 322).

The integrated communications control device can also be used to redirect incoming calls to a plurality of locations. Additional steps that are performed to redirect an incoming call are indicated by boxes drawn with broken lines in FIG. 3. First, when an inbound call is received, it is placed on hold by the receiving device (box 300). The CRV of the inbound call is stored by the device (box 302). Then, outbound calls to the plurality of locations are placed by the receiving device and held in a manner as described above (boxes 304–310). As the timers associated with each of the calls expire, the receiving device clears the associated calls via the D-channel, as described above (boxes 312–314).

If the timers are not expired, the device checks if an outgoing call is answered (box 316). If any of the calls is answered before its associated timers expires, the telephone network will send a message to the device over the D-channel, indicating that the call associated with a particular CRV has been answered (box 318). The calling device retrieves the answered call and the original inbound call from hold (box 330), and connects the inbound call to the answered call by retrieving them from hold to their respective B-channels and connecting the two B-channels within the calling device, effectively transferring the inbound call to the answering telephone device (box 332). Alternatively, the inbound call and the answered call can be joined by instructing the telephone network to combine the two calls using network conference or transfer facilities, permitting the entire operation to be accomplished using a single B channel. The calling device clears the remaining unanswered or busy outbound calls by sending the appropriate instructions to the telephone network over the D-channel (box 334).

Since none of the outbound calls are assigned to a B-channel during the waiting period before any outbound calls are answered, it is possible to retrieve the original incoming call from hold, and play an informational message or tone to the calling party during the interim. This is interrupted when the telephone network sends notification that one of the outbound calls has been answered.

With this technique, the number of simultaneous calls is no longer limited by the number of B-channels, but is limited by the number of calls that can be put on hold. The telephone network may impose various limits, such as a limit on the number of calls that can be on hold for a given time, on each BRI line. A subscriber can purchase different service plans from the telephone company to fit their need for simultaneous multiple calls. In this manner, a subscriber to a single ISDN line can enjoy the many benefits of simultaneous multiple calls without having to purchase an expensive telephone switching system. Furthermore, the simultaneous multiple calls function enhances the capabilities and functions of a network of integrated communications control devices. An incoming call to one of the devices within the group can now be answered by any one of the devices in the group, as the incoming call is simultaneously distributed to all the devices. Thus, remotely linked integrated control devices can now distribute an incoming call just like an expensive PBX system.

In the manner as described above, the integrated communications control device of the present invention is used to control the communications across the ISDN line of a single office. Multiple integrated communications control devices at remote locations can also be linked together into a group or virtual office to provide enhanced capabilities and functions to each of the users. Each device is made aware of the members of its group by storing in the memory of the device, the telephone number of the other group members. A sequence number and an alphanumeric identifier is also stored with each entry in the group list. In this manner a group can be created and additional members added with the only limit on the number of members being the amount of memory available to store the list of group members. Accordingly, a scalable telephone network system can be created between multiple users at remote locations, without the physical constraints of typical business systems. It should be apparent to those skilled in the art that sub-groups within a group can also be configured using the integrated communications control device of the present invention.

It also should be apparent to those skilled in the art that callers and targets which are not part of the group or are not connected to an ISDN line can still make calls to and receive calls from an integrated communications control device of the present invention. When making calls to or receiving calls from non-group or non-ISDN telephone equipment, the device recognizes that the call is outside the system and uses the ISDN connection as a traditional trunking arrangement to interface to the PSTN.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

We claim:

1. A communications control device configured for coupling to one or more digital subscriber lines, the device including a calling circuit for establishing a plurality of concurrently pending outgoing calls, wherein the plurality of concurrently pending outgoing calls exceeds a number of bearer channels associated with the digital subscriber lines, and further wherein the calling circuit includes means for initiating the plurality of concurrently pending outgoing calls and means for holding each of the plurality of concurrently pending outgoing calls after each of the concurrently pending outgoing calls is initiated.

2. The device according to claim 1 wherein the calling circuit further comprises means for retrieving an answered call, wherein the answered call is one of the plurality of concurrently pending outgoing calls that is first to be answered.

3. The device according to claim 2 wherein the means for holding automatically places each of the plurality of concurrently pending outgoing calls on hold after each of the concurrently pending outgoing calls is initiated.

4. The device according to claim 2 wherein the means for retrieving further comprises:
   a. means for associating one of a plurality of unique identifiers with each of the plurality of concurrently pending outgoing calls;
   b. means for receiving a first identifier associated with the answered call, wherein the first identifier is one of the plurality of identifiers; and
   c. means for assigning the answered call to a bearer channel of the digital subscriber line according to the first identifier.

5. The device according to claim 2 wherein the calling circuit further includes means for redirecting an incoming call to a first answered of a predetermined number of locations by placing the incoming call on hold for providing a maximum number of bearer channels for outdialing, means for assigning the incoming call to a first bearer channel, means for instructing the means for initiating to place the plurality of concurrently pending outgoing calls, means for assigning the first answered call to a second bearer channel; and means for connecting the first bearer channel to the second bearer channel within the integrated communications device, thereby joining the incoming call to the answered call.

6. The device according to claim 2 wherein the calling circuit further includes means for redirecting an incoming call to a first answered of a predetermined number of locations by placing the incoming call on hold for providing a maximum number of bearer channels for outdialing, means for assigning the incoming call to a first bearer channel, wherein the incoming call and the answered call are combined by means of network conference or transfer facilities.

7. The device according to claim 2 further comprising means for clearing the plurality of concurrently pending outgoing calls that are not answered after the answered call is answered.

8. A network of devices each configured for coupling to one or more digital subscriber lines and including an ability to establish a plurality of concurrently pending outgoing calls exceeding a number of digital subscriber lines coupled to the device, each of the devices comprising:
   a. means for initiating the plurality of concurrently pending outgoing calls:
   b. means for automatically placing each of the plurality of concurrently pending outgoing calls on hold after each of the concurrently pending outgoing calls is initiated; and
   c. means for retrieving an answered call, wherein the answered call is a first answered one of the plurality of concurrently pending outgoing calls.

9. The network of devices according to claim 8 wherein the means for retrieving comprises:

a. means for associating one of a plurality of identifiers to each of the plurality of concurrently pending outgoing calls;

b. means for receiving a first identifier associated with the answered call, wherein the first identifier is one of the plurality of identifiers; and c. means for assigning one of the plurality of concurrently pending outgoing calls to a bearer channel of the digital subscriber line according to the first identifier.

10. The network of devices according to claim 8, wherein the network has the ability to simultaneously redirect an incoming call to a predetermined number of locations, each of the devices further comprising:

a. means for placing the incoming call on hold for providing a maximum number of bearer channels for outdialing;

b. means for assigning the incoming call to a first bearer channel;

c. means for assigning the answered call to a second bearer channel; and d. means for connecting the first bearer channel to the second bearer channel within the integrated communications device, thereby joining the incoming call to the answered call.

11. The network of devices according to claim 8, wherein the calling circuit further includes means for redirecting an incoming call to a first answered of a predetermined number of locations by placing the incoming call on hold for providing a maximum number of bearer channels for outdialing, means for assigning the incoming call to a first bearer channel, wherein the incoming call and the answered call are combined by means of network conference or transfer facilities.

12. The network of devices according to claim 8, further comprising means for clearing the plurality of concurrently pending outgoing calls that are not answered after the answered call is answered.

13. A method of establishing a plurality of concurrently pending outbound calls to a plurality of different locations over one or more digital subscriber lines, comprising the steps of:

a. initiating one of the plurality of concurrently pending outbound calls, thereby forming an initiated call;

b. automatically placing the initiated call on hold prior to it being answered;

c. repeating steps a and b for each of the plurality of concurrently pending outbound calls; and d. retrieving an answered call from hold, wherein the answered call is a first answered one of the plurality of concurrently pending outbound calls.

14. The method according to claim 13, wherein the plurality of concurrently pending outbound calls exceeds a number of bearer channels of the digital subscriber line.

15. The method according to claim 13, further comprising a step of placing an incoming call on hold to maximize flexibility in assigning B channels.

16. The method according to claim 15, further comprising the step of instructing a telephone network to connect the incoming call to the answered call using network conference or transfer facilities.

17. The method according to claim 13, wherein an incoming call and the answered call are connected by joining two bearer channels of the digital subscriber line, one of the bearer channels carrying the incoming call and the other one of the bearer channels carrying the answered call.

18. The method according to claim 13, further comprising the step of clearing the plurality of concurrently pending outbound calls that are not answered by sending an appropriate command to a telephone network by means of a signaling channel of the digital subscriber line.

* * * * *